Oct. 27, 1953          F. S. KORSKI          2,657,324
CAST ROTOR
Filed March 28, 1952
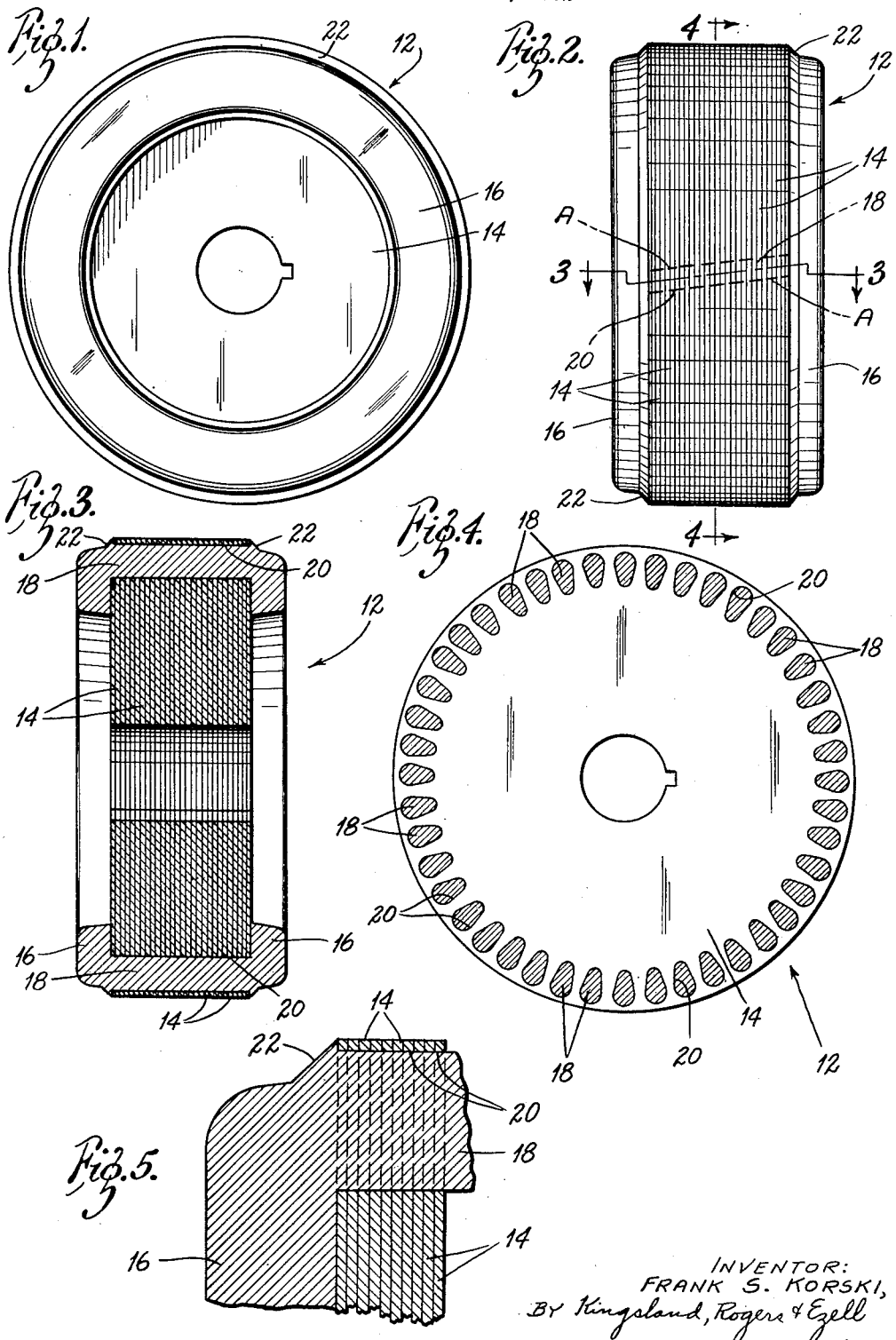
INVENTOR:
FRANK S. KORSKI,
BY Kingsland, Rogers & Ezell
ATTORNEYS Patented Oct. 27, 1953

2,657,324

UNITED STATES PATENT OFFICE 2,657,324

CAST ROTOR

Frank S. Korski, Brentwood, Mo., assignor to The Emerson Electric Manufacturing Company, St. Louis, Mo., a corporation of Missouri Application March 28, 1952, Serial No. 279,170

4 Claims. (Cl. 310—211)

The present invention relates generally to dynamo-electric machines, and more particularly to a cast rotor forming a part of such machine.

Cast rotors have been made for many years, but during all of this time certain problems have existed in respect thereto; and it is a broad object of this invention to overcome or minimize such problems.

A typical cast squirrel-cage rotor consists of a stack of circular laminations with a number of transverse slots adjacent the periphery of the stack, the slots being usually somewhat twisted. In manufacture, the stack of laminations is suitably disposed in a mold assembly, and metal, usually aluminum, is cast into the various slots and also cast into two end rings, one on the face of each end lamination of the stack of laminations. The conductors in the slots and the end rings are cast in a unitary or integral structure.

The rings have been located adjacent the periphery of the stack of laminations, and actually approached the actual periphery as closely as was practical. However, in present methods of molding and making cast rotors, it has been necessary that the radially outermost edge of the end rings be disposed a substantial distance inwardly from the periphery of the stack of laminations, in order to avoid making a mold with so thin an edge portion that it cannot stand up in service. A product of this has been that flashing fins or the like resulted, these extending radially outwardly from the rings, over the face of the outermost laminations, to or beyond the outer periphery of the rings. These fins or flashings are irregular in shape and must be machined off, because otherwise they may break off in service of the motor and get among the moving parts where they can do great damage. This involves a machining operation of substantial proportion, but it also almost always results in a reduction of the outer laminations, and of the rings, with consequent loss of electrical efficiency of the motor.

Another disadvantage in the former type motor with the end ring somewhat inset from the periphery of the stack of laminations is that in the machining of the laminations after the casting operation is performed, the portion of the end lamination that projects beyond the outer periphery of its end ring is not backed up, so that when the machining tool that is turning down the periphery of the stack of laminations comes to this end lamination, it tends to spread it from the adjacent lamination. Also, there are likely to be burrs at the start and at the finish of the machining cut, on the outer laminations of the stack. Such burrs must be removed because of the destructive effects should they become loosened after the motor is in operation—a situation that is particularly bad in a hermetically sealed refrigeration motor unit. The removal of burrs and slivers which were thus formed by the finishing operations is usually accomplished by chamfering the end laminations. But this has the disadvantage that some metal valuable to the electrical characteristics of the rotor is removed by such chamfering.

Broadly speaking, the objects of the present invention are to accomplish a rotor with each and all of the following advantages: an increased connecting area between the end ring and the conductors with which the end ring is cast integral, the elimination of the need to cut into the end laminations in order to accomplish a deburring thereof after the rotor is machined, and an elimination of the spreading of the end lamination during the machining operation, and the elimination of the necessity of cutting into the end laminations and possibly the end rings in order to remove flashing fins and burrs, and finally to obtain a stronger, more durable rotor and to obtain it more cheaply.

The present invention, in brief, provides a rotor of the type having integrally cast end rings and slot conductors, such as a squirrel-cage rotor, wherein the end rings include integrally cast outer edge portions that extend outwardly at least substantially to the outer periphery of the laminations after the finishing operation is performed thereon. The details of this and the manner in which it is obtained will appear from the description hereafter. The present application is a continuation-in-part of application Serial No. 268,234, filed January 25, 1952.

In the drawings:

Fig. 1 is an end elevational view of a completed cast rotor for dynamo-electric machines incorporating the teachings of the present invention;

Fig. 2 is an edge view of the rotor of Fig. 1;

Fig. 3 is a cross-sectional view substantially diametrical, taken on the line 3—3 of Fig. 2;

Fig. 4 is a vertical cross-sectional view taken substantially on the line 4—4 of Fig. 2; and Fig. 5 is an enlarged fragmentary portion of the upper left hand corner of the rotor shown in Fig. 3 illustrating certain features of the present improvement.

Referring to the drawing more particularly by reference numerals, 12 indicates generally a cast rotor for a dynamo-electric machine, such as a motor, incorporating the teachings of the present invention. The rotor 12 includes laminations 14, cast aluminum end rings 16, and conductors 18 around the periphery of the rotor, the conductors being cast integrally with the two end rings 16. Conventionally, the laminations 14 are slightly twisted, giving a consecutive slight misalignment of the openings 20, and hence of the conductors 18, cast into these openings 20, in a manner indicated by the broken lines $a$ in Fig. 2.

The rotor illustrated in the drawings is a finished rotor. It is evident, particularly from Figs. 2, 3 and 5, that the ring 16 has an integrally cast extension 22 projecting from its outer periphery at its base. As illustrated, this extension 22 is frusto-conical, and after the machining of the rotor, its radially outermost edge substantially coincides with the outer periphery of the laminations 14. The angle between the conical surface and the face of the laminations is substantially less than 90°, for a reason that will be explained. The extension 22 thereby acts as a chamfered support that backs up the laminations of the rotor and provides for a very solid, strong rotor accomplishing the objectives previously set forth.

In the construction of this type of rotor, one of the typical methods of molding is to mount a stack of stamped out laminations 14 on an arbor with a mold plate on each of the opposite faces. Each mold plate has an annular groove to receive metal that forms the end ring. A wedge clamp or the like may be passed through the arbor so as to clamp the stack of laminations very tightly between the two mold plates on the opposite faces of the stack of laminations. The foregoing sub-assembly is then inserted into a well, and liquid aluminum is forced into the cavities to form the two end rings and the conductors all as an integral structure.

The former construction of the mold plates has been to make them slightly smaller in outer diameter than the diameter of the laminations. Then it has been necessary to have a sufficient mass of material in the plates around the rims between the outer peripheries and the ring cavities to avoid chipping and breaking of the molds in use, and also to seal off the flow of metal. The minimum distance considered practical has been in the order of $5/64''$ radial extent from the outer edge of the ring cavity to the outer periphery of the mold plate.

A difficulty with this has been that it is impossible to have a tight sealed fit of the ring against the lamination around the entire periphery of each plate. Consequently, when the aluminum was caused to flow into the mold rings and the conductors, it actually flashed out to form fins extending along and sometimes beyond the outermost lamination. Such flashing fins had to be turned off by machining after the molding was completed because otherwise they might come off during operation of the motor and interfere with the continued operation thereof. Also, in order to get the fins completely off, and owing to the fact that the laminations might not be completely true with respect to being transverse to the axis of the rotor, there has been a considerable loss, by the machining operation, in the outer laminations, as well as in the end rings themselves. Consequently, the machining operation was itself tedious and furthermore, it reduced the amount of metal available in the outer laminations, and in the end rings, thereby reducing the electrical characteristics of the rotor.

In the present rotor, the mold plates may be basically the same as heretofore used except that the cavities for the end rings are extended radially outward so as to provide for the chamfered extensions 22 of the ring 16. This means, of course, that the end ring cavities are extended somewhat beyond the outer limits of the conductors of the rotor. In order to avoid having a narrow edge in each mold plate which might chip off or break in use, the mold plates are extended an adequate distance beyond the outer periphery of the laminations to provide sufficient strength. Yet, it will be understood that with this arrangement there is an actual area of contact of only approximately $1/64''$ between the annular land area of the mold plates beyond the outer limits of the cavities forming the extensions 22 of the end rings 16, and the laminations. This narrow $1/64''$ surface is much superior from the standpoint of forming an effective mold seal than is the larger land area heretofore employed. Hence, there is a substantial reduction in the flashing fins that are formed.

However, the flashing fins become a less serious factor in the present type of rotor for another reason. The $1/64''$, or approximately that, by which the laminations extend radially beyond the outer limit of the chamfered extensions 22, is substantially the amount of the laminations that is machined off in order to obtain the finished rotor. Consequently, when the machining tool moves across the rotor, turning down the peripheries of the laminations (it may move from right to left, for example, in Figs. 2 and 3 of the drawings), the final lamination is not bent over by the tool in the machining operation. Furthermore, this peripheral turning operation itself machines off any flashing fins that may exist, because the extensions 22 cause the rings to extend out to the periphery of the rotor, eliminating the formerly existing rotor face-area between the rings and the periphery, across which area the fins might form, and eliminating any need for machining down the face of the rotor. And even if there be certain irregularities or if there be slivers after the machining operation is finished, such slivers are of such minor nature that they may be easily machined off by the lightest cut right at the edge of the final lamination.

Consequently, the present rotor does not have the end lamination machined down on its face to eliminate fins and slivers as has heretofore been necessary. Also, the end rings are not required to be turned down in the process of eliminating the flashing fins and slivers.

We may note that the turning or machining of the laminations is performed not only to obtain a smooth rotor with a uniform air gap, but actually to provide the necessary air gap, it being understood that usually the rotor laminations are stamped out of the stator laminations in such wise that machining is necessary in order to obtain any air gap at all and in order to have a uniform air gap.

In considering the present cast rotor, it will be seen, especially from Figs. 3 and 5, that there is a larger cross-sectional area of connection between the ring 16 and the several conductors 18. Consequently, there is better electrical communication between these parts than has been possible heretofore with the old type of ring construction without the chamfered extensions 22. In addition, a more durable rotor is provided, and yet it is a rotor that may be manufactured at a considerable savings over the formerly used rotor.

With the use of the extension 22 having its conical surface at substantially less than 90° to the face of the laminations (approximately 45° being desirable), any problem of matching the outer periphery of the ring with the outer, machined periphery of the laminations is eliminated. If the ring, in other words, were designed to have the same outer diameter as that of the machined laminations, the production department would have a very difficult task, because irregularities make the matching of the cast and the machined surfaces almost impossible. And if it be attempted to make the ring coincide with the laminations, small steel chips may be forced into the aluminum, or the steel surface of the rotor may become smeared with aluminum. Another advantage of the angular surface is that it facilitates any removal of chips, since with the edge-like surface, only a light tool touch will remove any chips present.

It is understood that modifications may be made within the compass of the present invention. We have referred to the projections or extensions of the end rings as being chamfered and frusto-conical. Variations may be made in the specific shape of these extensions 22. The reason for using the frusto-conical shape is that that is the simplest one that requires a minimum of aluminum. Aluminum beyond that shown is to some extent wasted. However, variations can be made in this construction and in the shapes, if desired.

What is claimed is:

1. A rotor for a dynamo-electric machine comprising a plurality of circular laminations of uniform diameter in stacked concentric array, a plurality of conductors disposed adjacent the periphery of said stacked array and extending generally transversely thereto, and at least one end ring integral with said conductors and disposed in parallel abutting relation with the outer face of an end lamination of said stacked array, the radially outer part of the end ring having a frusto-conical tapered surface that extends both radially outwardly and axially inwardly toward the end lamination at an included angle of not less than 30°, and terminates at said end lamination in a sharp peripheral edge that extends around the rotor, the sharp edge having a diameter substantially coinciding with the outer periphery of the stack of laminations.

2. The rotor of claim 1 wherein the diameter of said peripheral edge exceeds the diameter of a circle circumscribing the plurality of conductors.

3. A rotor for a dynamo-electric machine comprising a plurality of circular laminations of uniform diameter in stacked concentric array, a plurality of conductors disposed adjacent the periphery of said stacked array and extending generally transversely thereto, and at least one end ring integral with said conductors and disposed in parallel abutting relation with the outer face of an end lamination of said stacked array, the radially outer part of the end ring having a tapered surface that extends both outwardly and toward the end lamination at not more than about 45° to the surface of the end lamination and terminates at said end lamination in a sharp peripheral edge that extends around the rotor, the sharp edge having a diameter substantially coinciding with the outer periphery of the stack of laminations.

4. A rotor for a dynamo-electric machine comprising a plurality of circular laminations of uniform diameter in stacked concentric array, a plurality of conductors disposed adjacent the periphery of said stacked array and extending generally transversely thereto, and at least one end ring integral with said conductors and disposed in parallel abutting relation with the outer face of an end lamination of said stacked array, the radially outer part of the end ring having a tapered surface that extends both outwardly and toward the end lamination at not more than about 45° to the surface of the end lamination and terminates at said end lamination in a sharp peripheral edge that extends around the rotor, the sharp edge having a diameter substantially coinciding with the outer periphery of the stack of laminations, the portion of the end ring having the tapered surface constituting an auxiliary projection outward from that part of the end ring next to the end lamination.

FRANK S. KORSKI.

References Cited in the file of this patent

UNITED STATES PATENTS

| Number | Name | Date |
|---|---|---|
| 1,592,939 | Kanaky | July 20, 1926 |
| 1,686,699 | Lauffer | Oct. 9, 1928 |
| 1,793,854 | Johnson | Feb. 24, 1931 |
| 1,819,148 | Coates et al. | Aug. 18, 1931 |
| 1,925,052 | Larsh | Aug. 29, 1933 |
| 2,011,116 | Potter | Aug. 13, 1935 |
| 2,065,213 | Dolan | Dec. 23, 1936 |
| 2,176,871 | Harrell et al. | Oct. 24, 1939 |
| 2,292,167 | Smith | Aug. 4, 1942 |
| 2,304,067 | Anderson | Dec. 8, 1942 |
| 2,368,295 | Goran | Jan. 30, 1945 |
| 2,392,802 | Anderson | Jan. 15, 1946 |
| 2,528,154 | Ludwig et al. | Oct. 31, 1950 |